No. 660,524. Patented Oct. 23, 1900.
E. R. BRIGGS.
CONVERTIBLE CARRIAGE.
(Application filed Aug. 24, 1900.)
(No Model.) 2 Sheets—Sheet 1.
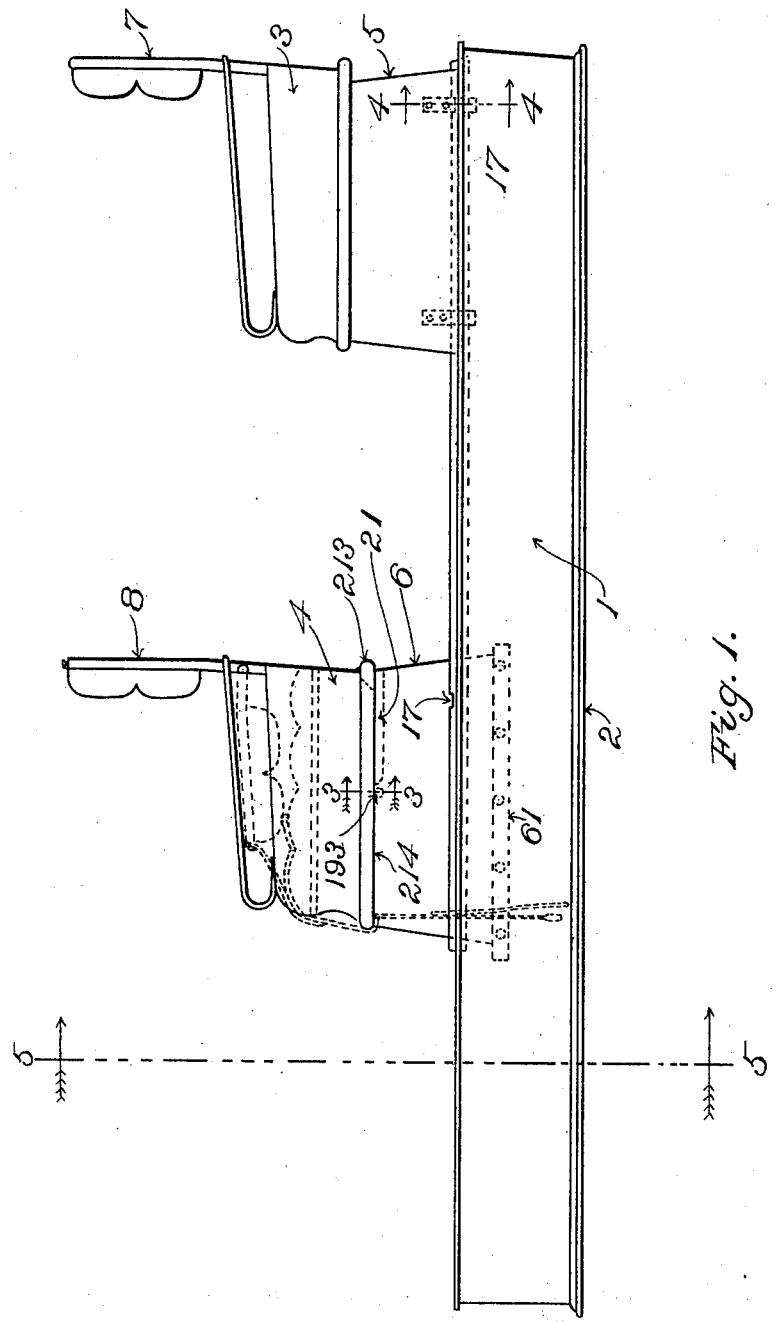
Witnesses:
Oscar F. Hill
Robert Wallace.
Inventor:
Edward R. Briggs
By Macleod Calvert Randall
Attorneys.

No. 660,524. Patented Oct. 23, 1900.
E. R. BRIGGS.
CONVERTIBLE CARRIAGE.
(Application filed Aug. 24, 1900.)
(No Model.) 2 Sheets—Sheet 2.
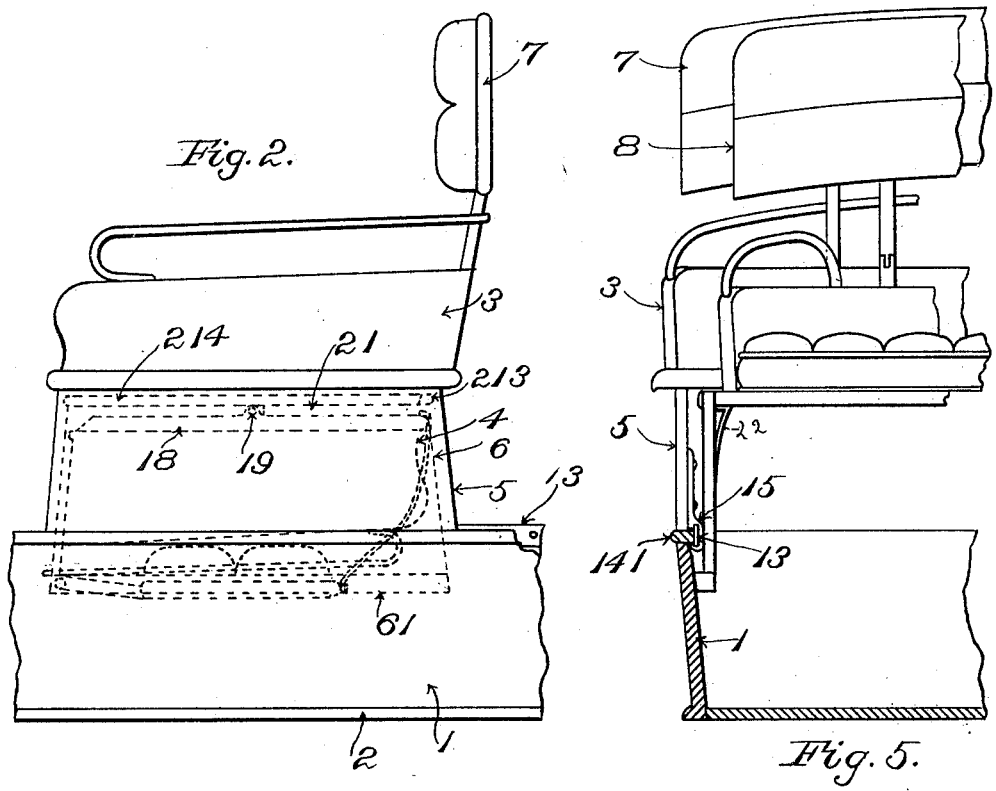
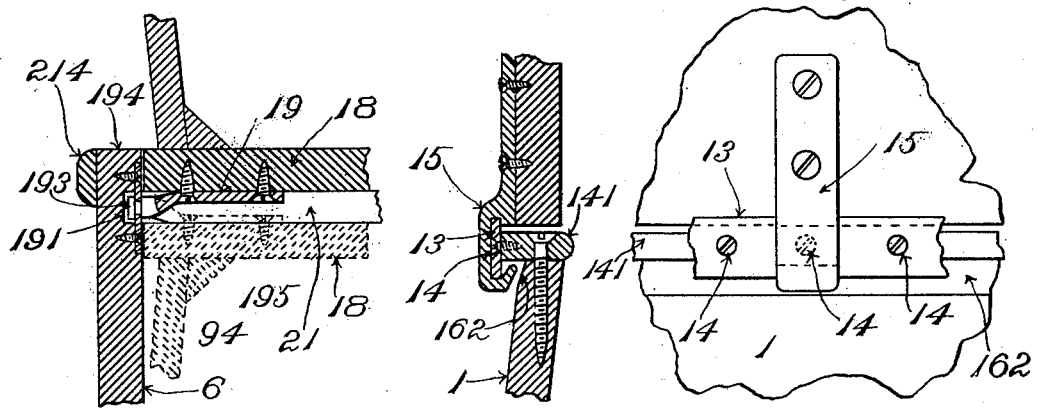
Witnesses.
Oscar F. Hill
Robert Wallace.
Inventor:
Edward R. Briggs
by Macleod Calvert & Randall
Attorneys.

UNITED STATES PATENT OFFICE.

EDWARD R. BRIGGS, OF AMESBURY, MASSACHUSETTS.

CONVERTIBLE CARRIAGE.

SPECIFICATION forming part of Letters Patent No. 660,524, dated October 23, 1900.

Application filed August 24, 1900. Serial No. 27,903. (No model.)

*To all whom it may concern:*

Be it known that I, EDWARD R. BRIGGS, a citizen of the United States, residing at Amesbury, in the county of Essex, State of Massachusetts, have invented a certain new and useful Improvement in Convertible Carriages, of which the following is a specification, reference being had therein to the accompanying drawings.

In vehicles having two seats extending transversely across the carriage-body it not infrequently becomes desirable to remove one of the seats from its place, thereby converting the vehicle into one of the single-seated type. A leading purpose of effecting this change is to render the space occupied by the extra seat available for luggage and the like. Another purpose is to preserve the seat itself from wear and injury while not in use. To effect these objects, it has for obvious reasons been found unsatisfactory to remove the extra seat entirely from the carriage, and therefore attention has been turned to the problem of making provision within the vehicle itself for the reception of the seat in such a manner as to occupy little or no space that ordinarily would be otherwise utilized and to protect the seat so far as possible from damage. It is also practically required that the carriage shall present a neat appearance in either condition of use, preferably not indicating its convertible character to any noticeable degree.

It is the purpose of my invention to produce a vehicle satisfying more completely than heretofore the conditions named above.

My invention is described in the following paragraphs, illustrated in the accompanying drawings, and defined in the claims at the close of this specification.

In the drawings, Figure 1 is a side view of a carriage-body provided with my improvements, showing both of the seats in place for use. Fig. 2 is a similar view showing the extra seat disposed in its inoperative position, only the middle portion of the carriage-body being shown and some concealed parts being indicated in dotted lines. Fig. 3 is a sectional detail on the line 3 3 of Fig. 1. Fig. 4 is a sectional detail on the line 4 4 of Fig. 1. Fig. 5 is a sectional view on the line 5 5 of Fig. 1 looking in the direction indicated by the arrows adjacent to the ends of such lines. Fig. 6 is an elevation of the parts shown in Fig. 4.

In the drawings, 1 1 designate the side panels of the body, and 2 the bottom or floor of the same.

3 is the rear seat, and 4 the front seat, these being shown as both facing forward.

5 5 are the risers or crickets for the rear seat, and 6 6 those for the front seat.

7 is the back of the rear seat, which is or may be rigid, and 8 is the back of the front seat, which preferably is arranged to fold down, as indicated in dotted lines in Fig. 1.

In accordance with my invention the frame of one of the seats is arranged to be transferred into a position directly below that which it normally occupies and the risers of the other seat are spaced farther apart than those of the first and the two seats are made movable with relation to each other, whereby when the movable seat-frame is transferred into its depressed position the seats may be telescoped together, the wider seat protecting and concealing the narrower one.

In carrying my invention into effect I usually arrange the shifting frame in connection with the front seat. The risers of the rear seat will then be spaced wider apart than those of the front seat, and the rear seat will be mounted to telescope over the front seat. Thus the former will inclose the latter not only at the sides by the risers and at the top by the seat-frame, but also at the front by the seat-fall and at the rear by the cross-panel 12, by which the risers 5 5 are braced apart.

The sliding forward of the rear seat is provided for by mounting the seat on parallel rails 13 13, which are affixed, as by screws 14, to the inner edges of the hard-wood moldings 141, covering the upper edges of the panels 1 1. Bearing-irons 15 (shown most clearly in Figs. 4 and 5 and indicated in Fig. 1) are screwed to the inner faces of the risers 5 and are formed at their lower ends to fit over both edges of the rails 13, whereby they not only furnish a bearing for the weight of the seat, but also prevent the latter from tipping or otherwise becoming displaced from its position of use. The inner edge of the panel may be beveled, as at 162, opposite the lower edge of the rail 13 to accommodate the inturned ends of the bearing-irons. Notches 17 17 are cut in the upper edge of each rail 13 at the point where one or both of the bearing-irons rest when the seat 3 is in each of its extreme positions to receive the bearing-irons and prevent unintended sliding of the seat.

The risers 6 6 of the forward seat are supported upon ledges 61 61, affixed to the inner faces of the side panels below the rails 13. The said seat is herein shown as fixed; but obviously any of the well-known forms of adjustable or removable seats may be substituted, or the seat may be otherwise supported, so long as the support is from within the rails 13, whereby to allow the rear seat to slide freely forward. The described manner of supporting the risers of the front seat is adopted as occupying very little room within the carriage-body and as not breaking the continuity of the floor-space therein.

It will be understood that the rails support the seat-risers a fraction of an inch clear of the moldings which cap the side panels, as indicated in Fig. 4, so that the seat may slide back and forth without marring the finish of the same. This clearance, however, is not noticeable, the risers apparently resting on the upper edges of the moldings and presenting a very neat appearance.

The shifting of the frame 18 of the front seat from its position of use to a position directly beneath the same is accomplished by pivoting the frame to the risers 6. For this purpose pivot-irons 19 are affixed to the under face of the said frame at the middle of each side thereof. The head 193 of each iron enters a recess 191 in the inner face of the riser 6. The said head is cylindrical and is provided with an annular groove 195. This groove receives the edges of two plates 194, affixed at opposite sides of the mouth of the recess 191 and covering the latter except for a circular aperture made by the above-mentioned edges of the plate, these each having a semicircular concavity. The said concavities, as will be seen, form a bearing for the head 191 of the pivot-iron 19 and restrain the latter from endwise movement. The rear portion of the seat-frame rests upon a fixed cross-piece 21, which bridges the space between the risers 6 6 and properly braces the latter together. As will be clear from Fig. 6, the head of the pivot-iron 19 is dropped to the center line of the cross-piece 21, so that when the seat-frame 18 is rotated through an angle of one hundred and eighty degrees it will assume the position indicated by dotted lines in Figs. 2 and 3 in contact with the lower face of the cross-piece and parallel thereto. When in use, the seat-frame is retained by spring-catches 22, Fig. 5, projecting from the inner faces of the risers 6 near the forward edge of the seat-frame. Any other suitable form of catch or bolt may be substituted for the one shown. When the seat-frame is in its inoperative position, it is prevented from swinging by the preponderance of weight at the forward side of its pivot, which operates to hold it against the under face of the cross-piece 21. The cross-piece is formed with a molding 213 at its rear edge, so as to conceal the joint made with the seat-frame and to form apparently the rear edge of the latter. In like manner the apparent side edges of the seat-frame are formed by moldings 214 at the upper edges of the outer faces of the risers 6. It will be understood that in effecting the conversion of the carriage from its two-seated form to its one-seated form in the construction shown herein the first step is to turn up the front seat-fall upon the cushion of the seat, as indicated in dotted lines in Fig. 1, and next to fold down and secure the back of that seat, as similarly indicated. The catches retaining the seat-frame will then be released, and the latter will be rotated into its depressed position. The rear seat will now be cleared from the rear notches in the rails on which it rests and will be slid forward over the front seat, the rear seat-fall being lifted and permitted to drop over and conceal the same. The reverse operation of converting the carriage again into a two-seated one is equally simple and rapid.

As will be evident from an inspection of the drawings, the entire length of the carriage-body is available for the reception of luggage and the like no matter whether it is being used as a one-seated or a two-seated vehicle. Furthermore, the conversion of the carriage from one condition to the other can be accomplished without removing or shifting such luggage. Other advantages of the described construction have already been referred to or will suggest themselves upon inspection.

What I claim is—

1. In a vehicle, the combination of the vehicle-body, a seat having its risers supported on the said body and having its frame movable with respect to the said risers, so that the said frame may be shifted from its position of use to an inoperative position between the said risers, a second seat having its risers spaced wider apart than the risers of the first seat, and means for telescoping the second seat upon the first, with the space between the risers of the second seat receiving and protecting the said first seat, substantially as described.

2. In a vehicle, the combination of the vehicle-body, a pair of risers connected by a cross-piece, a seat-frame located above the cross-piece and pivoted so as to rotate into a position below the latter, a second seat having its risers spaced wider apart than the risers of the first seat, and means for telescoping the second seat upon the first, substantially as described.

In testimony whereof I affix my signature in presence of two witnesses.

EDWARD R. BRIGGS.

Witnesses:
 LEPINE HALL RICE,
 OSCAR F. HILL,